United States Patent [19]

Siol

[11] Patent Number: 4,722,595

[45] Date of Patent: Feb. 2, 1988

[54] PROCESS FOR DISPLAYING OPTICALLY READABLE INFORMATION

[75] Inventor: Werner Siol, Darmstadt, Fed. Rep. of Germany

[73] Assignee: Röhm GmbH Chemische Fabrik, Darmstadt, Fed. Rep. of Germany

[21] Appl. No.: 784,260

[22] Filed: Oct. 4, 1985

[30] Foreign Application Priority Data

Oct. 5, 1984 [DE] Fed. Rep. of Germany ....... 3436476

[51] Int. Cl.$^4$ ............................ G02F 1/01; G11B 7/00
[52] U.S. Cl. ...................................... 350/353; 252/583; 252/589; 346/208; 369/100; 369/284; 428/332; 374/161
[58] Field of Search ............... 252/589, 583; 346/208; 369/100, 284, 288; 428/913, 332; 350/353; 374/161, 162

[56] References Cited

U.S. PATENT DOCUMENTS

| | | |
|---|---|---|
| 3,253,060 | 5/1966 | Koblitz et al. ........................ 525/199 |
| 3,458,391 | 7/1969 | Miller ................................... 428/204 |
| 3,459,843 | 8/1969 | Fischler ................................ 264/108 |
| 3,509,063 | 4/1970 | Teague et al. ........................ 252/583 |
| 3,946,612 | 3/1976 | Sagi et al. ............................ 374/161 |
| 4,082,892 | 4/1978 | Frump .................................. 428/332 |
| 4,085,999 | 4/1978 | Chahroudi ........................... 350/1.1 |
| 4,138,855 | 2/1979 | Jahan et al. ........................... 62/112 |
| 4,169,661 | 10/1979 | Yamada et al. ...................... 350/353 |
| 4,260,225 | 4/1981 | Walles ................................. 350/353 |
| 4,307,942 | 12/1981 | Chahroudi ........................... 350/353 |

FOREIGN PATENT DOCUMENTS

| | | |
|---|---|---|
| 2328900 | 12/1974 | Fed. Rep. of Germany . |
| 50-128528 | 9/1975 | Japan . |
| 2063500 | 7/1983 | United Kingdom . |

OTHER PUBLICATIONS

Paul et al., "Polymer Blends", J. Macromol. Sci. Rev. Macromol. Chem., C18(1), 109–168, 1980.
Paul et al., "Polymer Blends Containing Poly(Vinylidene Fluoride)", Polymer Engr. and Sci., Dec. 1978, vol. 18, No. 16, 1225.
Chai, "Compatibility of Poly(Butyl Acrylate) with Chlorinated Polyethylene", Makromol. Chem., 184, 1459–1468, (1983).
Kirk–Othmer, 3rd Ed., J. Wiley, 1982, vol. 18, "Polyblends", pp. 443–478.
Walsh, et al., "Compatibility of Poly(Methyl Methacrylate) and Chlorinated Polyethylene", (Polymer Communic), Polymer, 1982, vol. 23, p. 336.
Walsh, et al., "Compatibility of Polyacrylates and Polymethacrylates with PVC", Polymer, 1980, vol. 21, Nov., 1330.
Polymer Engineering and Science, vol. 18, No. 16, Dec. 1978, Paul, Bernstein and Wahrmund, Polymer Blends Containing Poly(Vinylidene Fluoride), Part IV: Thermodynamic Interpretations, pp. 1225–1233.

*Primary Examiner*—John F. Terapane
*Assistant Examiner*—Catherine S. Kilby
*Attorney, Agent, or Firm*—Oblon, Fisher, Spivak, McClelland & Maier

[57] ABSTRACT

A process for recording, storing and displaying optically readable information on a support using a polymer mixture P as the information carrier, wherein P comprises at least two different, mutually compatible polymers $P_1$ and $P_2$, and has a lower critical solution temperature (LCST), the optically differentiable modification of the information carrier being brought about by phase transition from a compatible polymer mixture below the LCST to demixed polymers $P_1$ and $P_2$ above the LCST or the reverse of this transition.

80 Claims, 1 Drawing Figure

PROCESS FOR DISPLAYING OPTICALLY READABLE INFORMATION

BACKGROUND OF THE INVENTION

1. Field of the Invention:

The invention relates to a process for recording, storing and displaying optically readable information, using a suitable plastic material as a storage medium.

2. Description of the Related Art:

In general, different polymer species are mutually incompatible because of the low entropy of mixing of the long polymer chains and the positive mixing energy between polymers. The finding that, contrary to the general tendency, certain polymer systems exhibit miscibility, therefore calls for a theoretically justified explanation of the phenomena.

For example, polyvinylidene fluoride is miscible with polymethylmethacrylate (PMMA) and with polyethylmethacrylate (U.S. Pat. Nos. 3,253,060, 3,458,391 and 3,459,843). To explain this phenomenon, a concept was developed, according to which specific interactions between groups of complementary dissimilarity in two polymers are said to make a positive contribution to the heat of mixing. This concept appeared to be suitable as a criterion for selecting other, miscible, binary polymer systems (D. R. Paul et al., Polymer Engineering & Science 18 (16) 1225–1234 (1978); J. Macromol. Sci. - Rev. Macromol. Chem. C 18 (1) 109–168 (1980); Kirk-Othmer, 3rd Ed. Vol. 18, pg. 443–478, J. Wiley, 1982).

The former literature reference also quotes a listing of known miscible polymer systems. The glass transition temperature $T_g$ of the mixtures was frequently used as proof of miscibility.

The occurrence of a lower critical solution temperature (LCST) is used as a different test of the miscibility of polymers. The existence of the LCST is based on the fact that a previously clear mixture separates into phases and becomes optically cloudy on being heated. This behavior represents unambiguous proof of the fact that the original polymer mixture consisted of a single, homogeneous phase at equilibrium.

In some systems, demixing is a reversible process on cooling. Up till now, LCST behavior has been reported for the following polymer systems: PMMA/styrene-acrylonitrile copolymers; polystyrene/polyvinyl methyl ether; poly($\epsilon$-caprolactone)/sytreneacrylonitrile copolymers; chlorinated rubber/ethylene vinyl acetate copolymers; PVC/ethylene vinyl acetate copolymers; poly($\epsilon$-caprolactone)/polycarbonate; polyvinylidene fluoride/PMMA; polyvinylidene fluoride/polyethylmethacrylate; polyvinylidene fluoride/polymethylacrylate; polyvinylidene fluoride/polyethylacrylate; polyphenylene oxide/o-chlorostyrene-p-chlorostyrene copolymers; polystyrene/polycarbonate of tetramethylbisphenol A; polyvinyl nitrate/polymethylacrylate (D. R. Paul et al., loc. cit.), as well as for the polymer systems PVC/poly-n-hexylmethacrylate, PVC/poly-n-butylacrylate, poly-n-propylacrylate (D. J. Walsh and J. G. McKeown, Polymer 21, 1330–1334 (1980), as well as for chlorinated polyethylene/butyl acrylate (D. J. Walsh et al., Makromol. Chem 184, 1459–1468 (1983)) and for PMMA/chlorinated polyethylene (D. J. Walsh et al., Polymer 23, 336–339 (1982).

The technique has followed various paths in order to produce optically perceivable information by the use of heat (or of energy, which can easily be converted into heat) ("Thermography").

In DE-OS No. 2,328,900 a thermographic copy material is described.

With this material, thin films of homogeneous polymer complexes of proton donor and acceptor units, which contain bonds dissociating at temperatures ranging from 50° to 120° C., form a thermally latent image. The image can be developed by moistening or spraying with a dye solution, a solvent or a gas (ammonia).

From DE-OS No. 3,042,331, a thermographic recording material is known, which contains a silver compound that is not light sensitive, in conjunction with an impact-resistant acrylic resin. The silver compound is sensitized by heating in the absence of light.

A layered, thermographic recording material is also the object of Japanese Patent No. 75/128,528 (cf. Chem. Abstr. 84, 128762b). With this material, visible images are obtained, when heat or other forms of energy, which, like light and electricity, can easily be converted into heat, are allowed to act on the layered material. An imaging layer of at least one fluorinated hydrocarbon and a compound selected from the group consisting of oximes, betaines, organometallic compounds, complex compounds of transition metals with aromatic compounds, guanidines and their salts, urea, thiourea and its salts, is applied to a carrier. For example, a dispersion of a liquid acrylic resin of a polymeric fluorinated hydrocarbon with isobutyroketone and toluene and acetaldoxime is applied on a high-grade paper support. On inscribing with a pen heated to 200° C., the inscribed areas appear black.

From U.S. Pat. No. 4,307,942, a device is known for preventing entrance of the sun's rays above a given temperature. This device consists of a layer of a porous polymeric material, a solvent and a temperature-sensitive substance, with which the porous material is impregnated and which has a negative solution entropy in said temperature range.

Such technical applications of polymers for automatically regulating energy penetration are quite rare. Solutions of individual polymers, which form a completely transparent solution or a transparent gel below a certain temperature range, but, above this temperature range, react with precipitation of small solid particles, which have a refractive index that differs from that of the solution, so that the solution loses about 50% of its transparency for visible light, are recommended in U.S. Pat. No. 4,307,942 as a non-mechanical sunshade.

As already mentioned, a relatively small number of mutually compatible polymer has been known up till now. Some of these combined systems exhibit the phenomenon that a cloud point occurs on heating; in other words, as the system is heated, a temperature is reached, at which this polymer mixture breaks up once again into two incompatible polymer systems. These systems show a lower critical solution temperature (LCST). FIG. 1 shows the phase diagram of such a polymer mixture with a lower critical solution temperature.

Compatible polymer mixtures, which have an LCST, have until now been investigated strictly from a scientific point of view. Utilization of this phenomenon to solve defined, technical tasks has, so far, not been proposed. The reason for this may well be that the cloud points of previously known compatible polymer mixtures with an LCST were observed only at very high temperatures, which frequently already caused decomposition of the individual polymers. For example, the PMA/polyvinylidene fluoride (PVDF) system shows a cloud point at about 300° C. and the polyethylmethacrylate/PVDF system shows a cloud point of 240° C.; PMMA/styrene-acrylonitrile copolymer has a cloud point at 170° C. and polycarbonate/polycaprolactone has one at 260° C.

Displaying optically perceivable information under the action of thermal energy was previously based predominantly on chemical conversions or on the utilization of phase transitions in liquid crystals.

A display of optical information, which comes about due to the fact that an optically clear storage medium loses its transparency in a defined manner, e.g. in specific geometric regions, under the action of thermal energy and appears white, for example, was until now unknown. A reversible transition between the transparent and the cloudy, that is, the white state of the storage medium, would appear to be particularly interesting.

Accordingly, new ways of displaying optical information in which an optically clear storage medium loses its transparency in a defined manner by using thermal energy, are of interest.

SUMMARY OF THE INVENTION

Accordingly, it is an object of the present invention to provide a process for displaying optically readable information based on thermal energy or an energy form convertible directly into thermal energy.

It is another object of this invention to employ polymer mixtures having a lower critical solution temperature in a process for displaying optically readable information.

According to the invention, these and other objects are attained by the discovery that the recording, storage and display of optically readable information, using a suitable plastic material as storage medium that can be modified in an optically differentiable manner by the action of thermal energy or an energy form convertible directly into thermal energy, can be achieved by a process, in which polymer mixture P, which have a lower critical solution temperature (LCST), are used as plastic material, the modification being brought about in an optically differentiable manner by the phase transition from a compatible polymer mixture below the LCST to demixed $P_1$ and $P_2$ and optionally $P_3$ above the LCST or by the reversal of this process.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawing, wherein.

DESCRIPTION OF THE PREFERRED EMBODIMENTS

Figure 1:
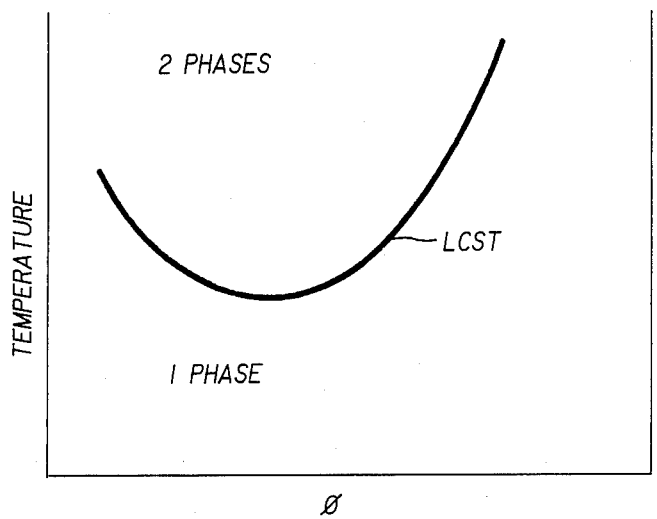
FIG. 1 shows the phase diagram for a polymer blend with a lower critical solution temperature (LCST).

In the present process, there is a transition, preferably under the influence of an increase in temperature, from a one-phase region, characterized by polymer compatibility (e.g. optically discernible by the transparency), to a two-phase region, characterized by demixing (optically discernible by cloudiness to opacity), while the transition in the reverse direction is brought about by a reduction in temperature. "Information", in the sense of the present invention, represents the optically discernible result of the transition from the (transparent) one-phase region to the (no longer transparent) two-phase region of the polymer mixtures P and the transition in the reverse direction.

As a rule, the optically differentiable modification of the plastic material under the action of energy is based on the fact that the refractive indexes of the individual polymer components differ. Preferably, the refractive indexes of the polymer components $P_1$ and $P_2$ of the polymer mixture ($P_1$, $P_2$, and optionally $P_3$) differ by a value of at least 0.01 and more preferably by 0.03. (The refractive index is determined in the usual manner.) See Houben-Weyl, 4th edition, vol. III/2, pages 407–424, G. Thieme Verlag, 1955. Within the meaning of the present invention, polymer mixtures P, the LCST of which is below 250° C., preferably below 140° C. and especially below 100° C., are particularly suitable. It is furthermore advantageous if the condition is fulfilled that the transmission is reduced by at least 20% as the temperature is increased from a value of 10° C. below to a value of 10° C. above the LCST.

Moreover, transmission is to be determined on a 0.1 mm thick, unpigmented sample platelet. The transmission advisably is determined according to the procedure of DIN 5036 (cf. Vieweg-Esser, Kunststoff Handbuch, Vol. IX, Polymethacrylate, Hanser-Verlag, Munich, 1975, page 197 ff).

Preferably, the transmission of the sample should be more than 80% in the temperature range of 10° C. below the LCST to at least 50° below the LCST and, in particular, the reduction in the transmission from more than 80% to less than 60% should take place in a temperature interval of less than 10° C. A further consideration, which may be of importance in the process, is the speed of the information input, which runs parallel to the speed of the temperature change. The temperature input should be such that the temperature of the polymer system P changes by more than 1° C. per second, preferably by more than 10° C. per second and particularly by more than 10° C. per tenth of a second.

Efforts should furthermore be made to ensure that two polymer phases (consisting of $P_1$ and $P_2$ or $P_3$) are present side by side above the LCST, that is, in the demixed form, and that at least one polymer phase has a domain size in the range of 10 nm$^2$ to $10^8$ nm$^2$ and preferably in the range of $10^2$ nm$^2$ to $10^6$ nm$^2$, the refractive indexes of the polymer phases differing by at least 0.01.

From the point of view of material composition, it is advantageous if the glass transition temperature $T_g$ of the compatible polymer mixture P is below 150° C. (For the determination of the $T_g$, cf. D. R. Paul & S. Newman, Polymer Blends, vol. I, chapter 5, Academic Press, New York, 1978). The glass transition temperature of the compatible polymer mixture should preferably be below 100° C. and particularly below 50° C.

The selection with respect to the exact position of the LCST and the glass transition temperature $T_g$ depends primarily on the intended use of the polymer mixtures.

Naturally, when using polymer blends or mixtures which have an LCST in an indicator panel or in a television screen, where a rapid, reversible change in the information entered (cloudiness on phase transfer as the temperature changes from below to above the LCST) is necessary, care must be taken to ensure that the polymer chains are very mobile at the LCST and that the glass transition temperature of the polymer mixture P lies below 50° C., preferably below 0° C. and particularly below −50° C.

Furthermore, attention must be paid to ensuring that the glass transition temperature is at least 50° C. and preferably at least 100° C. below the LCST of the polymer mixture.

As a rule, the glass transition temperature of the polymer mixture P and the glass transition temperatures of polymers $P_1$ and $P_2$ can be lowered by the addition of low molecular weight substances W (plasticizers, solvents). In this way, good mobility of the polymer chains and therefore a rapid, reversible phase transition at the LCST can be achieved in a simple manner.

Moreover, the polymer chain can also be plasticized by plasticizing comonomers (internal plasticization). The influence of specific monomers on the hardness of a polymer, as expressed by the glass transition temperature $T_g$ or the dynamic transformation, as defined in DIN 7724, can be estimated by the method of Vieweg-Esser, Kunststoff Handbuch, vol. IX, pp. 333–340, Carl Hanser-Verlag, 1975, and of BrandrupImmergut, Polymer Handbook, 2nd ed., Wiley-Interscience, 1975.* This form of increasing polymer mobility is more advantageous than adding low molecular weight substances as plasticizers, since the plasticizer is linked to the polymer and therefore cannot migrate.

* "Plasticizing" comonomers are generally understood to be those whose homopolymers have a $T_g$ of less than 20° C.

The requirements with respect to glass transition temperatures and LCST are different, if the polymer mixture is to be used for the long-term storage of information. A rapid, reversible transition frequently is undesirable here.

It is often the objective to store information irreversibly. The irreversible recording of information is possible in a particularly simple manner with polymer mixtures having an LCST. As a rule, the information is entered by increasing the temperature above the LCST (transition from the transparent, compatible one-phase region below the LCST to the incompatible, two-phase region above the LCST).

In this connection, the starting point is an LCST that is clearly above room temperature (for example, above 50° C. or, better yet, above 80° C.) and attention is paid to ensuring that the glass transition temperature of the polymer mixture P and/or at least one of the polymers constituting the polymer mixture is at most 100° C. below the LCST. In particular, when using polymer mixtures for storing information irreversibly, the plasticizer portion (solvent portion W) of the polymer mixture is limited to 100 weight percent (based on the polymer content of the mixture). Especially preferred are systems with less than 50 weight percent of plasticizer (solvent).

A polymer mixture P with the lowest possible plasticizer content is of interest especially when using polymixtures without additional supporting material.

It has already been pointed out here that materials for the irreversible storage of information naturally must be processed below the LCST, for example, by extruding the composition at temperatures below the LCST or by pulling a film out of a solvent or by polymerizing the monomers to polymer $P_2$ in the presence of polymer $P_1$. Quite generally, however, it is necessary to work below the LCST with polymer systems having an irreversible transition.

Between the systems described for the irreversible storage of information and the previously described systems for the rapid display of information in indicator panels, there are systems for reversibly storing information. For systems intended for the rapid display of information very large intervals between the LCST and the glass transition temperature (as a rule, at least 100° C.) and polymer chains, strongly plasticized by the addition of low molecular weight substances and therefore readily mobile, are preferred. On the other hand, for systems intended for storing information irreversibly, a small plasticizer content, a small interval between the LCST and the glass transition temperature of at least one of the polymer components and a relatively high LCST are preferred.

In systems for storing information reversibly, the information (that is, the transition from the clear one-phase region at a temperature below the LCST to the cloudy two-phase region at a temperature above the LCST), is to be frozen in for the time being, that is, the cloudy, two-phase region should be retained even after cooling below the LCST. In addition, however, the possibility should exist of deleting at a later time the information entered. As a rule, such a system is achievable simply by a high cooling rate after the information is written in (a cooling rate, for example, of $> -10°$ C./sec; freezing-in the information). The deletion of the information, on the other hand, is accomplished by tempering (e.g. for 10 minutes) at temperatures barely below the LCST (e.g. LCST−10° C.). In this case, the glass transition temperature should lie in the range of 50° to 150° C. below the LCST. In general, the LCST should be above 50° C.

As already mentioned, one or more low molecular weight organic substances W may be added, if necessary, to the polymer mixture, consisting of at least two different polymers.

Advisably, the low molecular weight substance W has the property of being a solvent for at least one of the two polymers $P_1$ and $P_2$.

Furthermore, the low molecular weight substance W advantageously has a refractive index, which differs from that of the polymers $P_1$ and $P_2$ or of other polymers present in the system P. Through these means, the possibility arises that, because of the unequal distribution of the low molecular weight substance W between the two incompatible polymers, light scattering is produced even when the difference between the refractive indexes of $P_1$ and $P_2$ is slight.

In this connection, however, it must be taken into consideration that any asymmetry in the polymer-solvent interaction in a ternary polymer 1/polymer 2/solvent W system can produce a phase separation. Solvents are therefore generally used, which exhibit little asymmetry in the polymer-solvent interaction. As a rule, the low molecular weight substance W is an organic substance, that is, it is not water. Preferably, the low molecular weight substances W belong to the group of plasticizers and/or solvents for polymers. (See H. Gnamm, O. Fuchs, Lösungsmittel and Weichmachungsmittel, 8th edition, vols. I & II, Wissenschaftliche Verlagsgesellschaft mbH, Stuttgart, 1980). Advantageously, the low molecular weight organic substances W have a solid point below 10° C.; it is advantageous if the solid point is at least 50° C. below the LCST of the polymer system $P_1$ and $P_2$ etc.

In general, the content of low molecular weight organic substances W is 0.1 to 1,000 weight percent and preferably 5 to 300 weight percent of the weight of the polymers $P_1$ and $P_2$.

The Polymer Blend P

By definition, the polymer mixture or blend P consists of at least two polymer components $P_1$ and $P_2$. Polymer components $P_1$ and $P_2$ are structurally different and moreover of such a complementary dissimilarity, that energetic interaction between the polymers $P_1$ and $P_2$ is favored. The mixing enthalpy for the two polymer components $P_1$ and $P_2$ is also exothermic. According to present knowledge, the miscibility of the two polymers $P_1$ and $P_2$ is therefore based on the exothermic interaction of the individual segment pairs. These interactions can include various mechanisms, such as, for example, salt formation, hydrogen bonding, complex formation, coupling of phenyl groups, and dipolar interactions. As a rule, it suffices if the mixing enthalpy of the polymer components $P_1$ and $P_2$ is only slightly negative. With these assumptions, the presently known compatible polymer mixtures can be understood and new compatible polymer pairs can be found (cf. D. R. Paul et al., J. Macromol. Sc.-Rev. Macrmol. Chem. C. 18 (1) 109–168 (1980)).

The interaction between the polymers should not be so pronounced that the demixing of the compatible polymer mixture into polymer components $P_1$ and $P_2$ takes place, for example, only at very high temperatures, such as 300° C., as is the case, for example, in the PVDF/PMMA polymer system.

Quite generally, considering the use of the polymer mixture, the LCST should not be so high that the chemical change at the LCST is more than 1% of the monomer components per hour.

A relatively low LCST can be achieved, for example, with a large proportion of weakly interacting groups per molecule or with a smaller proportion of more strongly interacting groups. Usually, a high proportion of weakly interacting groups (e.g. weak dipole-dipole interactions) is preferred.

Preferably, at least one of the two polymers, $P_1$ and $P_2$, is insoluble in water at temperatures ranging from 0° to 100° C. In particular, only one of the two polymers forming the polymer mixture should be soluble in water. (The solubility of polymers in solvents generally can be described as a cooperative effect; that is, the solubility is at least 50 g/L or, in the other case, only negligible amounts are dissolved. In the first case, the polymer is regarded as being "soluble in solvent L".)

Advantageously, the difference between the LCST and the glass transition temperature $T_g$ should be at least 20° C. It is furthermore advantageous if the glass transition temperature of the polymer mixture P is at least 50° C. and preferably at least 100° C. below the LCST. The aforementioned comments, that the glass transition temperature is higher in information storage systems than in information transmitting systems, are applicable to the exact position of the glass transition temperature in relation to the LCST.

The polymer mixture P is formed from at least two chemically different polymers, $P_1$ and $P_2$. At least one of the two polymers should advantageously have a carbon content of less than 80%.

It is furthermore preferred that at least one of the two polymers has at least 5 weight percent (based on the polymer $P_1$ or $P_2$) of a group having a double bond or a triple bond on a carbon atom, such as, for example,

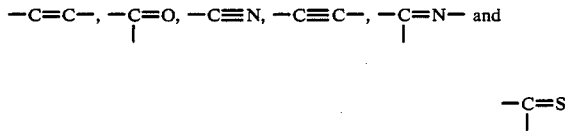

groups. Preferably, at least one of the polymers $P_1$ and $P_2$ contains covalently linked halogen, especially, fluorine, chlorine or bromine, advantageously in amounts of >10 weight percent, and/or chalcogen, especially oxygen and/or sulfur, advantageously in amounts of more than 10 weight percent. Advisably, the ratio of the halogen content (in weight percent) of polymer $P_1$ to the halogen content of the polymer $P_2$ is greater than 1.5:1 and preferably greater than 2:1. The ratio of the oxygen content of polymer $P_1$ to the oxygen content of polymer $P_2$ should advantageously be more than 1.2:1 and preferably more than 1.5:1.

Advantageously, moreover, at least one of the polymers forming the polymer mixture P should be a copolymer, in which the monomer, present as the main component, should constitute no more than 95 weight percent. It is furthermore of advantage, if, below the LCST, the polymer mixture P has a single glass transition temperature $T_g$ and no crystalline regions in the entire temperature range from room temperature (25° C.) to the LCST itself.

Advisably, the polymer components of the polymer mixture P should be so constituted, that none of the polymers $P_1$ or $P_2$ (or other polymers present) experiences a chemical change at the LCST, which exceeds 1%/hour (based on the monomer components in question).

The stability of the polymer components can be increased in a known manner by the addition of agents that protect against UV, aging or weathering, or of antioxidants, etc. (cf. Ullmann's Encyklopädie der techn. Chemie, 4th edition, vol. 15, Verlag Chemie, pp. 255 ff.). The amount added generally is 0.01 to 5 weight percent and preferably 0.1 to 1 weight percent, based on the polymer mixture P. In this connection, special mention is made of sterically hindered phenols, phosphites, thioethers, sterically hindered amines, benzophenones, benzotriazoles and oxanilides.

In general, the average molecular weight (weight average $\overline{M}_w$) of at least one of the two polymers $P_1$ or $P_2$ should be at least 2,000 and preferably at least 10,000; preferably, both polymers $P_1$ and $P_2$ should have a molecular weight of at least 2,000. (The molecular weight is determined in a known manner by light scattering, cf. Houben-Weyl.) Advantageously, at least one of the polymers have an average molecular weight $\overline{M}_w$ in the range of 2,000 to 500,000 and preferably in the range of 10,000 to 500,000; it is advantageous if both polymers $P_1$ and $P_2$ have an average molecular weight in the range of 2,000 to 500,000 are preferably in the range of 10,000 to 500,000.

The systems are also particularly interesting if the participating polymers, for example $P_1$ and $P_2$, are partially linked together covalently. Such covalent linkages can be achieved by block polymerization or by graft polymerization. Moreover, the mixing ratios, given in the following, should be taken into consideration. It is frequently already adequate, if one of the polymers, e.g. $P_2$, is produced by polymerization in the presence of the other polymer (e.g. $P_1$). The block or graft polymerization can be carried out by methods based on the state of the art. With respect to details concerning the synthesis of block and graft polymers, reference is made to the relevant literature, e.g. Houben-Weyl, Methoden der Org. Chemie, 14/1, pp. 110 ff., Block Copolymers, D. C. Allport, W. H. Janes, Appl. Sci. Publishers, Ltd. London, 1973; Graft Copolymers; H. A. J. Battaerd, G. W. Tregear, Polymer Reviews, vol. 16 (1967); Block and Graft Polymers, W. J. Burlant, A. S. Hoffmann, Reinhold Publishers Corp., New York, 1960.

The standard values for the mixing ratio in the polymer system P are a weight ratio of $P_1$ to $P_2$ in the range of 98:2 to 2:98, preferably in the range of 90:10 to 10:90 and especially in the range of 80:20 to 20:80. The polymer mixture may be colorless; it may however also be dyed. As a rule, the purpose of the addition of the dye is to increase the contrast after the transition from the one phase region (in which the temperature is below the LCST) to the two-phase region (in which the temperature is above the LCST)—and the reverse.

For the dyeing, preferably a dye of the known types, which are soluble in the system, or a pigment dye with discrete particles is used. In the latter case, the diameter of the pigment particles should advisably not exceed 50% of the average diameter of the polymer phase domains, which appear as polymers $P_1$ and $P_2$ are demixed. Dyes and pigments of the suitable type can, for example, be taken from Ullmann's Encyklopädie, 4th edition, volume 15, loc. cit., pages 275 to 280 (1978).

The dye content lies within the usual range of, for example, between 0.01 and 10 weight percent, based on the polymer mixture P.

Technically, the polymer mixture P can be employed in various forms. First of all, it is possible to use the polymer mixture P directly and without a supporting base that differs from the polymer mixture P. For this type of use, it is advantageous if the glass transition temperature of the polymer mixture P lies above 20° C. and, better yet, above 50° C. In particular, the use of the polymer mixture P directly, and without a supporting base differing from the polymer mixture P, finds application in the area of information storage, especially in the area of irreversible information storage. In this case, the polymer mixture P has the geometric shape of, for example, a disk, a tape or a fiber.

A further application of the polymer mixture P is where a supporting base is used. Usually, the polymer mixture P is applied to the supporting base with varying degrees of adhesion. Double-sided coating of the supporting base is also possible.

In a third case, the polymer mixture P is between a supporting layer and a covering layer. The supporting and covering layers may, moreover, be identical. The supporting base will consist of a transparent material, as will the covering layer. As a rule, the supporting base and the covering layer will consist of the same material and have the same dimensions. For practical reasons, the material used as supporting base, should have a glass transition temperature greater than 50° C. If carrier materials with a glass transition temperature below 50° C. are used, they should be cross-linked.

The thermal stability should be such that it does not interfere with the thermal treatment of the polymer mixture P; that is, it will usually be about 30° C. higher than the LCST of the system.

For use as the supporting material, there are transparent inorganic materials, for example, mineral glass such as silicate glass or infrared-transparent glasses based on the sulfides, selenides or tellurides of arsenic or antimony (chalogenide glasses), which absorb strongly in the visible region of the spectrum, but are transparent up to 10 $\mu$m in the infrared. Alternatively, the supporting base may also consist of a light-reflecting material, for example, a metal or a metallized surface (mirror).

The case in which polymer mixtures P are embedded between the supporting and covering layers (which generally are not different), is of particular interest, especially for a polymer mixture P with a glass transition temperature below −50° C. and also in the area of polymer mixtures containing solvents and/or plasticizers. Embedding between the supporting and covering layers permits the use of very readily movable polymer mixtures which are therefore very rapidly switchable. Embedding the polymer mixture between a supporting and a covering layer is therefore used especially for rapidly switchable indicator panels, in television screens and in similar systems.

There are generally no material-specific limitations to the geometric form of the polymer mixtures P. When using a supporting base or when embedding, the geometric form assumed by the polymer mixtures will generally be determined by the form of the supporting base and, possibly, by that of the covering layer.

The polymer mixture P will be present by itself, or on a supporting base or in an embedded state, for example in the form of a plate, disk, film or as an optionally flexible tape.

The supporting base or the covering layer may be dyed in an appropriate manner and thus, for example, assume the function of a filter for the incident light.

The polymer mixtures P may also be incorporated in a (transparent) material, whose refractive index below the LCST is identical with the refractive index of the polymer mixtures P. Advantageously, the material used for the embedding has a glass transition temperature of more than 50° C. The materials suitable for the embedding may, for example, be selected from the group of the above-named polymers that are suitable as a supporting base. In certain areas of application, especially for optical displays, it is advantageous to heat the whole system (polymer mixture P plus any supporting base, covering layer, etc.) to a working temperature, which is about 2° to 20° C., below the cloud point, in order to ensure the least possible time lag of the display system. It is consequently also advisable to keep the heat capacity of the system as a whole as low as possible; that is, to use the thinnest possible storage media, such as disks, films, tapes, etc., in order to make rapid switching possible. The (minimum) thickness of the polymer mixtures P as such and in their various configurations is determined, on the one hand, by the required coherence of the layer and, on the other, by a sufficient difference in transmission above and below the LCST that is required optically or for making a measurement.

In many cases, it suffices to use the polymer mixtures P in a layer thickness of from 0.0001 mm to 1 mm, preferably less than 0.1 mm and especially less than 0.01 mm, the polymer mixture P being on or incorporated in a supporting base or used without a supporting base. Particularly interesting is the case of incorporating the polymer mixtures P in a material, the refractive index of which is identical with the refractive index of the polymer mixture below the LCST and which accordingly forms a matrix M. While, in general, the change in the transmission of the polymer mixture P below and above the LCST is used for the storage, recording and display of information, it is also possible, especially in the case where the polymer mixture P is embedded between a supporting and a covering layer, to utilize the change in the intensity of the light at an angle (e.g. 90°) to the incident light, as the temperature changes from a temperature below LCST to a temperature above LCST, for displaying and transmitting information.

Particularly interesting are those systems in which the polymer mixture P is incorporated in the form of discrete particles having a diameter in the range of 20 nm to 200 μm and, preferably, in the range of 50 nm to 50 μm, in a material M functioning as a matrix. The particle size can be determined using a light or electron microscope.* Especially preferred in this connection are particles with a diameter in the range of 50 nm to 5 μm. Moreover, it is possible to produce these fine particles by emulsion polymerization of at least one of the polymer components $P_1$ or $P_2$. Of particular interest is the synthesis of the polymer components $P_1$ and $P_2$ of the polymer mixture P in an emulsion polymerization process comprising at least two steps. Especially preferred, is a procedure in which a latex, synthesized largely from polymer component $P_1$, functions as a seed latex for the emulsion polymerization of polymer component $P_2$. It may furthermore be of advantage to utilize the aforementioned latex, containing polymer component $P_1$ and/or $P_2$, as a seed latex for the emulsion polymerization of a polymer component PM, PM being a polymer which is compatible with matrix M or, highly preferably, is chemically identical with the matrix M. The function of this PM portion is to anchor polymer P in matrix M. Usually, matrix M will not form a compatible polymer mixture with either of the polymer components $P_1$ and $P_2$, which constitute the polymer mixture P.

*Cf. Kirk-Othmer, 3rd edition, vol. 21, J. Wiley, 1983, pp. 115-117 and Houben-Weyl, 4th edition, vol. XIV/1, pp. 365-372, Georg Thieme Verlag, Stuttgart, 1961.

Furthermore, when incorporating polymer mixture P in particle form in a matrix M, the refractive index of the polymer mixture P below the LCST largely coincides with the refractive index of the matrix M (as a rule, $\Delta\eta < 0.01$). In addition, generally $\eta_D$ $matrix > \eta_D$ $polymer\ 1$ ($\Delta\eta > 0.01$) in conjunction with $\eta_D$ $matrix < \eta_D$ $polymer\ 2$ ($\Delta\eta > 0.01$). In other respects, the material used as carrier should advantageously fulfill the condition that $$\eta_D\ support \approx \eta_D\ polymer$$

It is furthermore useful if the carrier material fulfills the conditions that $\eta_D\ support < \eta_D\ polymer\ mixture\ P$
$\eta_D\ support > \eta_D\ polymer\ P_1$
$\eta_D\ support < \eta_D\ polymer\ P_2$ These are, for example, indicator panels, in which light enters in the plane of the panel, light leaving the panel only at points where the temperature exceeds the LCST. Moreover, the material used for the embedding should advantageously have a glass transition temperature $T_g$ higher than 50° C. For such indicator panels where light enters in the plane of the panel, it is preferred if the face side of the indicator panel is coated with phosphorescing substances.

Finally, the configuration in which the polymer mixture P is present on a supporting base or embedded between a supporting base and a covering layer in a thickness of less than 0.1 mm and particularly, of less than 0.01 mm, is of special interest.

The thickness of the supporting base is codetermined, within certain limits, by the choice of material. Generally, it is on the order of 1 μm to 10 mm and preferably of 5 μm to 0.5 mm. When layers that do not consist of the polymer mixture P are used; that is, when embedding in a matrix or incorporating between a supporting base and a covering layer, efforts should be made to ensure that at least one of these supporting or covering layers does not exceed a thickness of 0.5 mm.

A further technical possibility lies in the use of the polymer mixtures P in the form of a fiber. In the case of an arrangement as a fiber, the polymer mixture P, for example, can form the core of the fiber, while the sheath functions as the "supporting base".

In the last-mentioned case, it is advantageous if the relationship of the refractive indexes is as follows:

$\eta_D\ sheath > \eta_D\ polymer\ P_1\ or\ P_2$ and
$\eta_D\ sheath < \eta_D\ polymer\ mixture\ P$.

The fiber functions as a fiber-optical light guide with the possibility of altering the transmission of light by changing the temperature (increasing the temperature above the LCST or lowering the temperature from above to below the LCST).

The optically readable information of the present invention is based on the use of the polymer mixture P in the various configurations given. The information becomes manifest due to cloudiness resulting from reaching or exceeding the LCST. Accordingly, a further scale for the arrangement of information and for its use is presented. In implementing the process—as mentioned above—the polymer mixture P or the whole of the system containing the polymer mixture P, comprising, for example, supporting base, covering layer or matrix, is advisably maintained at an operating temperature less than 20° C. and preferably less than 5° C. below the LCST. The polymer mixture P, or the system containing it, is ready in this state for accepting information.

In its various configurations, the polymer mixture P can be used, for example, as an information medium. In this connection, it is advantageous if the cloudiness due to demixing, produced by supplying heat, remains constant in the regions specified for this purpose, so that the change in transmission within one week does not exceed 5% (based on the transmission of the sample that has previously been heated to above the LCST and then frozen).

As already mentioned it is possible, for example to fix the information supplied through freezing the information medium by decreasing the temperature at a rate of more than 10° C. per second. Conversely, the information, present as cloudiness, can, for example, be deleted by heating at 5° C. below the LCST for a period of, for example, one hour.

An interesting possibility of implementing the process is where the information is read in digitally. As already shown, the information can be produced as a static or as a variable quantity.

An important area of application of the inventive process extends to data acquisition. The informational units, available for expressing the information, consist of geometrically limited elements, which are differentiated by their transparency, so that the possibility exists of displaying binary numbers (e.g. one bit="light transmission", the other bit="opacity"). The information medium can be scanned by devices responding to brightness differences, for example, by means of a photocell. (See "Reading the Information" below.)

Other fields of application exist in the area of communication and advertising. For example, symbols, such as handwriting, data, etc., can be produced in a simple manner on display panels. If the rapidly reversible polymer systems, described below, are used, they can advantageously be used, for example, for operating indicator panels having a large area or for operating "moving" luminous advertising.

It is a desirable prerequisite for use in indicator panels that the information (which is based on increasing or decreasing the cloudiness) can be entered at a rate of $\Delta$ transmission/sec = >1% ($\Delta$ transmission in the percentage change in the transmission in unit time). For this application, the decay time of the information should advisably follow the following condition: $\Delta$ transmission/min = >10% and preferably $\Delta$ transmission = >10%/sec. In many areas of application, it is desirable to be able to control the supply of energy to the polymer mixture P in such a manner that precise spatial/timewise control of the modification produced is brought about for the purpose of the invention. The spatial and timewise distribution of energy can be controlled by electrical or optical means with the aid of appropriate devices.

The information can be entered in directly by means of elements, which emit heat (heating elements). Advantageously, the heating elements are so designed that the energy supplied or given off can be changed in a spatially and/or timewise controlled manner. Handwriting or movable images, for example, can be produced in this manner.

In general, it is possible to proceed by dividing the area, intended to be the supporting area for the information, into a grid (as is also known, in principle, for other optical storage media). The grid is defined by the number of the geometric distribution of the individual elements E, which are capable of emitting or transferring energy (as a first approximation, these elements are assumed to be points). A further parameter is the maximum and the relative power which is to be omitted by the elements E. The extent of the area of the elements E which are capable of transferring energy depends within certain limits on the resolution requirements for the information to be reproduced. As a standard value, it may be assumed that an individual element E, e.g. as a source of heat, has an energy emitting surface area of not more than 10 mm$^2$ and preferably one of between $10^{-5}$ and $10^{-1}$ mm$^2$. Experience suggests that the storage medium containing the polymer mixture P, which is usually present in the form of plates or disks or screens, can be heated at at least 10,000, usually uniformly distributed independent points. The medium for portraying the information, such as indicator panels, video screens or disks, can be adapted, for example, to state of the art television screens with respect to their horizontal and vertical grid divisions. The medium (the disk) may be so divided that each of the separately heatable points decomposes into a red, yellow or blue element.

The version which is the reverse of the one described above is also possible. In this case, the polymer mixture P is maintained in one of the described application forms at a temperature above the LCST in the initial state (in which it is essentially opaque). The information can be portrayed by switching off the point shaped, energy-transmitting elements E selectively, or by selectively carrying away the energy, for example, by pointwise cooling to temperatures below the LCST, such as by allowing gas under pressure, e.g. compressed air, etc., to flow out. The advisable operating temperature in such a case is at least above the LCST. Solar energy, for example, can be used to maintain the operating temperature in the last-mentioned case.

Thermal energy, in all its various forms can be supplied to the polymer mixtures P, provided that these are adapted to the object of a selective, controllable energy delivery.

In the majority of cases, the thermal energy to be delivered is generated by conversion of energy that originally is electric. It is possible, for example, to use the energy that is produced by the passage of a current through a material (resistance heat), or the energy that is transmitted by radiation and, if necessary, converted (infrared, light, microwave).

Especially the use of lasers, which, as is well known, emit very intensive, coherent, monochromatic, strictly parallel radiation, suggests itself. In particular, the use of lasers like those also employed in material processing and in medicine, especially ruby and argon laser, YAG:Nd and glass:Nd lasers are suitable (YAG=yttrium-aluminum-garnet (see Ross "Laser Applications" New York Academic Press, Ready "Industrial Applications of Lasers", London, Academic Press, 1978)). The use of semiconductor diode lasers is also advantageous.

When using these energy sources, the energy delivered is focused on each element E depending on the intended action (as a function of the LCST).

Reading the Information

The recognition or recording (reading) of information primarily takes place optically. For example, the information can be read by incident light. In many cases, the information can be read, for example in daylight, that is, without switching on an additional light source.

Another possibility consists of reading/recording the information by means of a light source, mounted behind the system containing the polymer mixture P. Moreover, the information can also be read by means of one or several light sources which emit in the plane in which the information lies.

As a rule, light having a wavelength from 200 to 800 nm is used for reading the information. Reading and recording devices of the type usable for this purpose are known (see e.g. "Programmsteuerung" (Program Control) in Encyklopädie Naturwissenschaft und Technik, Verlag Moderne Industrie, Landsberg 1980).

The Polymers P$_1$ and P$_2$

The starting point are the polymer mixtures, which have an LCST. Preferably, at least one of the polymers P$_1$ and P$_2$ should be accessible by free radical polymerization. An additional criterion for selection is the LCST of the polymer mixtures P, which should be below 250° C., preferably below 140° C. and especially below 100° C.

Included in the category of the first-mentioned characteristic are the known polymer systems P which are formed from polymethylacrylate/polyvinylidene fluoride (LCST=300° C.) or polycarbonate/polycaprolactone (LCST=260° C.), which then appear to be less suitable. Of technical interest is the polystyrene/polyvinylether system with a cloud point of approximately 120° C. [M. Bank et al., Macromolecules 4, 43 (1971), J. Polym. Sci., Polym. Phys. Ed. 10 1097 (1972), T. Nishi et al., Polymer 16, 285 (1975), T. Kwei et al., Macromolecules 7, 667 (1974)], which is referred to in the following as $P_1$-I/$P_2$-I.

Of particular interest, furthermore, are the known polymer mixtures P of carbonyl-group-containing polymers $P_1$ and halogen-containing polymers $P_2$. Examples are polymer mixture P of ester-group-containing polymers $P_1$ and chlorine-containing polymers $P_2$, such as the polymer mixture of ethylene/vinyl acetate copolymers (referred to in the following as $P_1$-II) and chlorinated polyethylene (referred to in the following as $P_2$-II), as well as the polymer system P, consisting of butyl acrylate/chlorinated polyethylene, referred to in the following as $P_1$-III/$P_2$-II and moreover the PMAA/chlorinated polyethylene system, referred to in the following as $P_1$-IV/$P_2$-II. In addition, the poly-n-hexylmethacrylate/PVC, poly-n-butylacrylate/PVC, and poly-n-propylacrylate/PVC systems may be mentioned.

The system of ester-group-containing polymers as $P_1$ and chlorine-containing polymers as $P_2$ can be varied considerably. It is a prerequisite that the chlorine portion in polymer $P_1$ is high enough (usually in the range of 25 to 75 weight percent) and that an adequate number of carbonyl groups are available as interaction partners in polymer $P_1$. (The parts by weight of the carbonyl group (C=O) usually fall within the range of 10–35%.)

As an example of the wide possibilities of varying the system of ester group in polymer $P_1$/chlorine-containing polymer $P_2$, the following, previously unknown systems, based on poly(meth)acrylate/chlorinated rubber, are mentioned: copolymers of isobutyl methacrylate and 2-ethylhexyl methacrylate (referred to in the following as $P_1$-V) and chlorinated rubber (referred to in the following as $P_2$-III), as well as copolymers of methyl methacrylate and ethyl acrylate (referred to in the following as $P_1$-VI) and chlorinated rubber ($P_2$-III). These mixed systems of $P_1$-V/$P_2$-III and $P_1$-VI/$P_2$-III are described in greater detail in the examples.

Experience has shown that the exact position of the cloud point (LCST) is affected, in general, within cerain limits, by varying one or more of the following parameters:

(a) by changing the proportion of interacting groups in the polymers $P_1$ and $P_2$. This can come about by copolymerizing with other monomers or by varying the monomer building blocks within a homologous series. For example, the proportion of ester groups in the polymers becomes less in the polymethylmethacrylate, polyethylmethacrylate, and polybutylmethacrylate series. Moreover, it is a general rule that the LCST falls as the proportion of interacting groups becomes less, and conversely, polymers with a higher concentration of functional groups (e.g. the proportion of chlorine in polymers $P_2$ and ester groups in $P_1$) have a higher LCST (cf. D. J. Walsh et al., Macromolecules 16, 388–391 (1983)).

(b) By changing the proportion of $P_1$ or $P_2$ (see FIG. 1) and, possibly, by including a further polymer $P_3$ in the polymer mixture P.

(c) By adding one or more low molecular weight substances W as plasticizer and/or solvent. As a rule, the LCST is lowered by the addition of low molecular weight substances W, especially if only small amounts, for example 10 weight percent, based on the polymer mixture P, are used. Above all, the mobility of the system P is increased by the addition of plasticizers (see R. E. Bernstein et al., Macromolecules 10, 681–686 (1977)).

(d) By changing the molecular weight of the polymers $P_1$ and $P_2$. In general, the LCST decreases with increasing molecular weight (J. H. Halary et al., Polymer, 25, 956–962 (1984)). The molecular weight selected should, however, not be too high; preferably, it is less than $10^6$ and especially less than 500,000, since kinetic effects play an overriding role at higher molecular weights (cf. D. J. Walsh, Zhikuan Chai, Makromol. Chem. 184, 1459–1468 (1983)).

Taking parameters (a)–(d) into consideration, a given polymer system P can be optimized into an irreversible data storage system or be developed into a rapidly switchable indicator system. This is shown in the following, in which the system of ester-group-containing polymers as $P_1$/chlorine-containing polymers as $P_2$, as well as the systems of polystyrene/polyvinylether and polymethylmethacrylate(PMMA)/styrene-acrylonitrile(SAN) copolymers are used as examples.

Polymethylmethacrylate (as polymer $P_1$) and styrene-acrylonitrile copolymers (with 28 weight percent of acrylonitrile as polymer $P_2$) represent a polymer mixture that has an LCST. The LCST of such a system (PMMA $M_w$: approximately 100,000; SAN: $M_w$ approximately 200,000) is about 170° C. By varying the proportion by weight of $P_1$ or $P_2$ in the polymer mixture P, the LCST can be varied in the range from about 150° C. to about 220° C. (see R. E. Bernstein et al., Macromolecules 10, 681–686 (1977)). The polymer system P (consisting of 75 weight percent of $P_1$ and 25 weight percent of $P_2$) has an LCST of about 155° C. The glass transition temperature $T_g$ of this polymer system is at about 100° C. The polymer mixture is clear at temperatures ranging from room temperature to the LCST. As the LCST is exceeded, the mixture becomes cloudy. The cloudiness is maintained even after cooling to temperatures below the LCST. This polymer mixture P is therefore suitable for the irreversible storage of data.

If this system is to be converted to a reversible storage system, the mobility of the polymer system in the region of the LCST must be increased. In other words, the interval between the LCST and the glass transition temperature ($T_g$) must be extended. This is accomplished in a simple manner by the addition of plasticizers. For example, the addition of 30 weight percent of dimethyl phthalate lowers the glass transition temperature to about 30° C. The LCST is lowered to about 145° C. by the addition of the plasticizer. The glass transition of this system P therefore is about 115° C. below the LCST. This system is suitable for the reversible storage of information. The information can be written-in by heating briefly to temperatures above the LCST and fixed by quenching to room temperature. The information is deleted by tempering at the LCST—10° C.

The system of polystyrene/polyvinylmethylether ($P_1$-I/$P_2$-I) is discussed as a further example. In this system, the LCST can be varied considerably while keeping the $P_2$-I ($\overline{M}_w$ polyvinylmethylether: 51,500) constant, by varying the molecular weight of the polymers $P_1$-I ($\overline{M}_w$ polystyrene: 10,000 to 200,000). While the polymer mixture P, at a 1:1 weight ratio of polystyrene to polyvinylmethylether, has an LCST of about 110° C. in the case of the high molecular weight polystyrene ($\overline{M}_w$=200,000), the corresponding mixture with a polystyrene, which has a $\overline{M}_w$ of only 10,000, has an LCST of about 220° C. In addition, the LCST can also be changed by varying the mixing ratio of $P_1$-I/$P_2$-I (cf. also T. Nishi and T. K. Kwei, Polymer, 16, 285–290).

The possibility exists of extending the range of uses of this system by the addition of low molecular weight substances. For example, by adding 100% toluene to a mixture of polystyrene/polyvinylmethylether 1/1, a polymer mixture P is obtained, which has an LCST of about 60° C. Due to the high proportion of low molecular weight substance, the system exhibits great mobility. The transmission changes rapidly as the temperature changes from below (clear) to above (cloudy) the LCST (decrease in transmission by more than 20% within less than one second). The reverse of this process, the change in temperature from above (cloudy) to below (clear) the LCST, occurs likewise. This is rapidly reversible system, which is suitable for displaying optically readable information, for example, on indicator panels of large area.

A different possibility of varying the polystyrene/polyvinylmethylether system is given by the chemical structure of the polymers. The polystyrene, for example, can be altered in a simple manner by copolymerization with other comonomers. By copolymerizing styrene with p-methylstyrene, a polymer mixture P (copolymer of 80 parts styrene and 20 parts p-methylstyrene/polyvinylmethylether) with a lower LCST can be produced. On the other hand, by copolymerizing styrene with acrylates, polymer mixtures with a higher LCST become accessible. (For example, the copolymer system of 80 parts of styrene and 20 parts of methyl acrylate/polyvinylmethylether).

Polymer mixtures of ester-group-containing polymers as $P_1$ and chlorine-containing polymers as $P_2$ are particularly suitable for the purposes of this invention. As reported, a number of polymer mixtures P, which have an LCST and are based on the combination of ester-group-containing polymers and chlorine-containing polymers, are known. Finding new polymer mixtures and tailoring such polymer mixtures to the inventive use is particularly simple in the case of these polymer mixtures. This demonstrated in Example 1. As shown there, the miscibility of the polymethyacrylate ($P_1$) with a given polymer ($P_2$=chlorinated rubber with 67% chlorine) decreases with increasing lipophilicity of the ester. With this system of $P_1$-V/$P_2$-III (copolymer of isobutyl methacrylate and 2-ethyl-hexyl methacrylate/chlorinated rubber), the range of uses can also be adjusted essentially through the mobility of the polymer in order to ensure the least possible time lag of the system.

Other polymer mixtures, which satisfy the aforementioned selection criteria for P, can be found in a systematic manner, one component, $P_1$ for example, being kept constant and the other, $P_2$, being varied.

Such a procedure could consist of dissolving polymer component $P_1$ in a suitable solvent, such as toluene, and mixing in solutions of polymer component $P_2$ in various ratios. A film is then drawn and this film is evaluated visually, once at room temperature and then at an elevated temperature (for example at 100° C. or 140° C.). Polymer incompatibility is shown by cloudiness, frequently already as the polymer solutions are being mixed in the test tube. The choice of solvent is important, in order to avoid a large asymmetry in the polymer solvent interaction.

Mixing the polymers in the melt is another possibility. As a rule, however, this should be done below the LCST, since mixing above the LCST always results in two phases. A simple mixture of the polmers can also be achieved by preparing a homogeneous solution of polymers $P_1$ and $P_2$ in a solvent and precipitating this solution containing the polymers $P_1$ and $P_2$ in a nonsolvent.

A further possibility is the polymerization of the monomers of one polymer, e.g. $P_1$, in the presence of mixtures P and, in addition, through the glass transition temperature of the polymer mixture. For example, the $P_1$-V/$P_2$-III polymer system, without the addition of plasticizers, is an irreversible multiphase system above the LCST. In practice, brief localized heating (for example, 30 seconds at a temperature above the LCST) leads to a permanent white coloration at the site of heating. This is a type of system for storing data. Moreover, the cloudiness produced by heating the polymer mixture P above the LCST is read by a light-sensitive device, for example, by a photocell. Other applications are also possible with such a system; for example, a dyed, transparent plate can be provided with a white inscription.

Especially when used as advertising vehicle, but also when used for data storage, the polymer mixture P can function as a carrier and simultaneously as information material. Advantageously however, the other configurations (see above) will also be used.

On the other hand, if larger amounts of low molecular weight substances are added to the $P_1$-V/$P_2$-III polymer system, a rapidly reversible polymer system P which can readily be used for optical displays is obtained. Especially for such a use as an optical display, it is advantageous to heat the whole system to an operating temperature barely (about 20° to 5° C.) below the cloud point and to supply energy briefly polymer $P_2$. The monomers from which polymer $P_1$ is built up can thus be used as a solvent for $P_2$. However, for particular concentrations, phase separation in the course of the polymerization can also occur here, so that in some cases, the polymerization to polymer $P_1$ must be carried out in several stages. [See also J. S. Higgins and D. J. Walsh, Polymer Engineering and Science, 24, 555 (1984).]*

*The synthesis of the polymers $P_1$ and $P_2$ follows directly from the state of the art. (Cf. Houben-Weyl, loc. cit and other references.)

Circuit

In practice, the energy will be supplied mainly through
(a) light
(b) heat radiation
(c) electrically generated heat.

In all cases, use can be made of the circuitry possibilities and of models of the state of the art. Especially the laser or fiber optical light guide is available for heating with light according to (a).

For a large indicator panel, a relatively complicated control is necessary for controlling the spatially and timewise variable course. The same holds true for the display of information on the video screen.

For an application such as a simple luminous advertisement that produces a moving image, it is sufficient to trigger, at offset times, heating wires, which can be mounted according to a symmetrical grid or some other pattern on the surface, so as to transfer energy to it.

A further interesting application of the polymer mixtures P within the scope of information technology lies in the area of the fiber optical light guides. In accordance with the state of the art, fiber optical light guides are understood to be rods or thin fibers of highly transparent optical materials, which transmit light through multiple total reflections. The light which has entered through the (polished) inlet surface follows all the bends of the fiber and emerges from the polished end surface of the fiber. (See N. S. Kapany: "Fiber Optics", Academic Press, New York 1967.)

Fiber optical light guides with a large core (reflection at the sheath), as well as fiber optical light guides with a small core (monomode fiber which contains only one light beam), as well as fiber optical light guides of a material core and with an air gap to the absorbing sheath, can be employed using the polymer mixtures P. Here also, depending on the temperature, the polymer sytem acts as a conductor of light (below the phase boundary in the one-phase region) or as a scattering element (above the LCST, in the two-phase region).

The light scattering, which occurs as the clear, one-phase region changes into the two-phase region, naturally depends on, among other factors, the magnitude of the domains formed by the demixed polymers $P_1$ and $P_2$. This domain structure can be controlled, for example, by adding graft polymers of the two types of polymers on top of one another.

Moreover, such domains can properly be specified by using, for example, one of the two polymers in the form of a slightly cross-linked particle, a latex particle for example, and controlling the characteristics of the cloudiness in this manner.

The Configurations of the Polymer Mixtures P

The polymer mixture P, which optionally contains the low molecular weight substance W in the form of a plasticizer and/or a solvent, can be applied as such on a support.

The polymer mixture P, optionally in the form of a mixture containing the low molecular substance W, can be used for gluing supporting base to covering layer (which usually consist of identical materials). Embedding between the supporting and covering layers can also be accomplished in the manner of a monomer/-polymer (mopo) system.

The polymer mixture P can also be prepared by co-precipitation, applied and, particularly, pressed as such on the supporting base.

Various processes of the plastics industry are suitable for treating and processing the polymer mixture P, the physical and chemical data of the polymer mixture P, such as the $T_g$, LCST, thermal stability, etc., being taken into consideration.

The polymer mixture P can, for example, be produced or treated by injection molding. In other cases, the polymer mixture P can be produced, treated or, for example, applied on a supporting base by extrusion. In both cases, it is advantageous to produce the polymer mixture P at a temperature below the LCST.

As already mentioned, polymer mixtures which fulfill the requirements of the inventive systems P can be found by a selective, systematic procedure.

The invention now being generally described, the same will be better understood by reference to certain specific examples which are included herein for purposes of illustration only and are not intended to be limiting of the invention or any embodiment thereof, unless specified.

EXAMPLE 1

Specific Development of a Polymer Mixture P

Chlorinated rubber (67 weight percent of chlorine) is dissolved in toluene. This solution is mixed 1:1 with solutions of different methacrylates. A film is pulled and this film is observed at room temperature and at an elevated temperature (e.g. 140° C.). It is often not necessary to cast a film, since polymer incompatibility is frequently indicated by a cloudiness which develops already when the polymer solutions are mixed in the test tube.

| | Evaluating the Film at | |
|---|---|---|
| Polymer Mixture | Room Temperature | 140° C. |
| Chlorinated rubber*/ Polymethylmethacrylate** | clear | clear |
| Chlorinated rubber*/ Methylmethacrylate-Butylmethacrylate Copolymer (20:80)*** | clear | clear |
| Chlorinated rubber*/ Polyisobutylmethacrylate**** | clear | partially cloudy |
| Chlorinated rubber*/ Poly-2-ethylhexylmethacrylate***** | cloudy | cloudy |

**$\overline{M}$ = approx. 100,000 (PLEXIGUM M 910 ® product of Rohm GmbH)
***$\overline{M}$ = approx. 100,000 (PLEXIGUM P 24 ® product of Rohm GmbH)
****$\overline{M}$ = approx. 100,000 (PLEXIGUM P 26 ® product of Rohm GmbH)
*M = approx. 85,000 (Viscosity according to DIN 53015 8.5–10 mPa s. PERGUT S10 ® product of Bayer AG)
*****Polymer synthesized by solution polymerization of 2-ethylhexyl methacrylate in toluene. Initiator: dilauroyl peroxide. Polymerization temperature: 70° C.

Conclusion: The good compatibility of the chlorinated rubber with polymeric esters of methacrylic acid decreases with increasing lipophilicity of the esters of the methacrylate group.

By copolymerizing 2-ethylhexyl methacrylate, which, as homopolymer, is incompatible with chlorinated rubber, with the more compatible isobutylmethacrylate, polymer mixtures can be prepared with a lower critical solution temperature (LCST) of, for example, about 100° C.

The polymer mixture of chlorinated rubber/2-ethylhexylmethacrylate-isobutylmethacrylate copolymer meets the requirements of the polymer system P. The exact position of the LCST can be varied within certain limits by the mixing ratio and/or the addition of solvent and/or the addition of plasticizer.

EXAMPLE 2

Indicator Panel Based on a Rapidly Switchable Polymer Mixture $P_1$-V/$P_2$-III Having an LCST Chlorinated rubber (50 g, Pergut S 10 ® of Bayer AG) is dissolved in 200 g of toluene. After addition of 100 g of isobutyl methacrylate, 100 g of 2-ethylhexyl methacrylate and 2 g of dilauroyl peroxide, the polymerization is carried out at 70° C. Heating is subsequently continued for a further hour at 80° C. A solution, which is white at 70° C., results. Cooling to room temperature leads to a highly viscous, clear, yellowish solution. Two glass plates (each approx. 0.5 mm thick) are glued together with a few drops of this polymer solution. A crystal clear system results, which, on being heated to a temperature above the LCST (approx. 60° C.), suddenly becomes cloudly. This transition is completely reversible.

The following Table shows the light transparency of the system at room temperature and at 70° C.

| Light Transparency in the Glass/Polymer Mixture P/Glass System | | |
| --- | --- | --- |
| | Light Transparency % | |
| Wave Length (nm) | Room Temperature | 70° C. |
| 380 | 90 | 20 |
| 530 | 91 | 40 |
| 750 | 92 | 50 |

This Procedure: Heating to the light-scattering two-phase region and cooling to the clear, one-phase region was repeated at least 40 times without observing any change in the system.

Like the chlorinated rubber/2-ethylhexylmethacrylate-butyl-methacrylate copolymer polymer system, the chlorinated rubber/methylmethacrylate-ethylacrylate copolymer (3:2) polymer system also shows a LCST.

EXAMPLE 3

Information Storage on the Basis of a Thermally Irreversible Polymer Mixture $P_1$-VI/$P_2$-III having an LCST Chlorinated rubber (50 g, Pergut S 10 ® of Bayer) was dissolved in 200 g of toluene. Methyl methacrylate (120 g), 80 g of ethyl acrylate and 2 g of dilauroyl peroxide were added. The polymerization was subsequently conducted at 70° C. A further 200 g of toluene were added. At the end of the reaction, the temperature was maintained at 70° C. for a further 2 hours. After cooling, a viscous, clear, light yellow solution was obtained (solution 3A). Solution 3A was dried to a polymer film.

Heating the film briefly to temperatures above approximately 120° C. led to cloudiness at the site of heating. This cloudiness remained even on cooling. If the film is placed in a photometer, a light transmission of less than 40% is found at the heated sites, as against a light transmission of more than 90% at the sites not heated.

EXAMPLE 4

Reversible Information Storage

Solution 3A from Experiment 3 is mixed with 40% benzyl butyl phthalate (based on the polymer portion) and pulled on a glass plate and dried. A crystal clear polymer film, with a cloud point of 90° C., results. The phase transition is reversible in this case.

EXAMPLE 5

Information Storage with Reversible or Irreversible Storage, Based on $P_1$-VI/$P_2$-III If only slight amounts of plasticizer are added to the chlorinated rubber/methylmethacrylate-ethylacrylate copolymer system, the information, imprinted by supplying heat, can be fixed by chilling. This information can however be deleted once again by tempering at a temperature a few degrees centigrade below the LCST.

EXAMPLE 6

Indicator Panel, Based on a ($P_1$-I/$P_2$-I) Polymer Mixture having an LCST

A polymer mixture in toluene is prepared from 40 parts by weight of polystyrene ($\overline{M}_w$=approx. 50,000) and 60 parts by weight of polyvinylmethylether ($\overline{M}_w$=approx. 50,000) and coated on a 0.2 mm thick glass plate, which has been colored black. After the toluene has evaporated, an approximately 100 μm thick, clear polymer film is obtained. The film is covered with a 0.2 mm thick, colorless glass plate. Brief heating to 130° C. leads to a readily recognizable white coloration at the site of heating. The white coloration disappears once again on cooling, so that different, readily readable information (e.g. commercial spots) can be written one after another in the plate.

EXAMPLE 7

Polymer Blends P Produced According to Design

Use of polymers $P_1$ and $P_2$ with a relatively high glass transition temperature for producing an irreversibly fixed data storage system.

Polymethylmethacrylate (PMMA) has a refractive index $n_D^{20}$=1.492, its glass transition temperature Tg=105° C. Polystyrene (PS) has a refractive index $n_D^{20}$=1.59, its glass transition temperature Tg=100° C. In an unmodified state PMMA and PS are not compatible with one another. By introducing functions of complementary dissimilarity in either polymer compatibility can be actieved.

Thus for example PMMA is modified with a polymerizable acid (e.g. with itaconic acid); polystyrene, is correspondingly modified with a copolymerizable amin (e.g. N,N-dimethylamino-neopentyl methacrylate).

Procedure 7.1 In a polymerization flask equipped with a stirrer a mixture of
 71.25 g of methyl methacrylate
 3.75 g of itaconic acid
 0.225 g of dodecylmercaptane
 0.75 g of tert.-butyl perpivalate 150 g of methyl ethylketone is prepared and is stirred for 6 hours at 75° C. under argon as a protective gas. One obtains a clear slightly yellowish polymer solution.
7.2 To the solution obtained in this fashion the following substances are added:
 71.25 g of styrene
 3.75 g of 3-dimethylamino-2,2-dimethyl propyl-1-methacrylate
 0.225 g of tert. dodecylmercaptane and
 0.75 g of azo-isobutyronitrile and the mixture is polymerized for 20 hours at 80° C. One obtains a clear, slightly yellowish tinted polymer solution (solids contents: 48% by weight) which contains the $P_1$-X polymer (copolymer of 95% by weight of methylmethacrylate and 5% by weight of itaconic acid) and the $P_2$-X polymer (Copolymer of 95% by weight of styrene and 5% by weight of 3-dimethylamino-2,2-dimethyl-propyl-1-methacrylate). When drying the polymer solution thus produced, one obtains a clear polymer film, which on warming up above ca. 100° C. turns white. Hence by introducing an acid function in polymer species 1 and an amine function into polymer species 2 a polymer blend P was produced which is compatible at room temperature. The position of the phase separation temperature (LCST) can be adjusted by varying the amount of the acid or the amino functions present.

EXAMPLE 8

Production of a Data Storage Disk Using the Polymer Blend With LCST According to Example 7 ($P_1$-X/$P_2$-X)

As a polymeric carrier PMMA of high molecular weight (ca. $5 \cdot 10^6$) PLEXIGLAS 233 ®, commercially available from Röhm GmbH in the shape of $200 \times 200 \times 1$ mm plates was used.

Preparation of the Lacquer 26 g of the polymer solution from example 7 is diluted with
14 g of cyclohexanone
10 g of isopropanole A lacquer is obtained with a solids content (by weight) of 25%. Viscosity: 43 CST (determined according to Brookfield at 25° C.). The plates are then coated with the lacquer on one side. For drying the plates are first exposed to the atmosphere and are subsequently dryed at 65° C. in an electric oven. One obtains plates of said PLEXIGLAS with a clear coating on one side, which is 9 μm thick. Whatever operation is necessary (clearing of the substrate, filtration of the laquer and coating of should be carried out under conditions modelled on "clean room standards" (class 10). Topical warming on the coated side of the plate (warmed up to 95° C. at an area of 0.1 mm × 1 mm yields an inscription in such plate, which may be read out by measuring light scattering or transmission.

EXAMPLE 9

The data storage disk of example 8 is covered with a PMMA foil ca. 20 μm thick on the side coated with the polymer blend. The system is made up of the following layers
1 mm of PMMA (PLEXIGLAS GS 233 ®, available from Röhm GmbH)
0.009 mm of polymer blend $P_2$-X/$P_2$-X
0.020 mm of PMMA.

EXAMPLE 10

Polymer Blends P According to Design

Polymers $P_1$ and $P_2$ with a relatively low glass transition temperature are selected for producing a fast and reversibly demixing system. Poly-2-ethylhexylacrylate has a refractive index $n_D^{20} = 1.48$ it's glass transition temperature $T_g = -55°$ C.

A copolymer made of 70% by weight of tetradecylmethacrylate (methacrylic ester of a mixture of $C_{12}$-$C_{18}$ alkanols with an average carbon number of 14 in the alcohol portion) and 30% of styrene, refractive index $n_{20}^{20} = 1.51$; glass transition temperature < room temperature.

Poly-2-ethylhexylacrylate and the above copolymer of tetradecylmethacrylate ordinarily are not compatible. They can, however be blended, if one of those polymers contains a comonomer with an acidic function, whereas the other one contains a basic function. That is: by introducing groups of complementary dissimilarity into each of the polymers one can produce compatibility of the system. By increasing the proportion of acid or basic functions, respectively in the polymers, their compatibility will improve i.e. the LCST value will go up.

As will be shown in the following examples the LCST of a given polymer may be altred ad libitum by adjusting the proportion of acid or base functions present in each polymer.

10.1 Preparation of polymer $P_2$-XI

A mixture consisting of
75 g of 3-dimethylamino-2,2-dimthyl-propyl-1-methacrylate (15% by weight)
297.5 g of tetradecylmethacrylate (as described above); 59.5% by weight.
127.5 g of styrene (25.5% by weight)
is bulk polymerized after adding 1.5 g of tert.-dodecylmercaptane as a modifier and 1 g of azoisobutyronitrile (AIBN) as initiator. Reaction conditions: 24 hours at 55° C. and finally 24 hours at 60° C.

One obtains a soft clear, faintly yellowish polymer material with a specific viscosity $\eta_{spec}/C = 63$ ml/g. The specific viscosity is determined at 25° C. in a Micro-Ubbelohde-Viscometer at $1.1 \leq \eta_{rel} \leq 1.2$.

10.2 Preparation of polymer $P_2$-XII

The same polymerization procedure as in example 5.1 is used except that the proportions are modified as follows:
10 parts by weight of 3-dimethylamino-2,2-dimethyl-propyl-1-methacrylate
63 parts by weight of tetradecylmethacrylate
27 parts by weight of styrene
One again obtains a soft, clear faintly yellowish polymer material; specific viscosity $\eta_{spec}/C = 56$ ml/g.

10.3 Preparation of polymer $P_2$-XIII

The same polymerization procedure is used as in example 5.1 except that the proportions are modified as follows.
6 parts by weight of 3-dimethylamino-2,2-dimethylpropyl-1-methacrylate
65.8 parts by weight of tetradecylmethacrylate
28.2 parts by weight of styrene
One again obtains a soft, clear, faintly yellowish polymer matter; specific viscosity $\eta$hd spec/C = 48 ml/g.

EXAMPLE 11

Preparation of Polymer $P_1$-XI

To a reaction vessel containing 500 g of toluene and 1.25 g of tert.-butyl per-2-ethylhexanoate under argon as protective gas a mixture consisting of
1.25 g of tert. butyl per-2-ethylhexanoate
0.75 g of dodecyl mercaptane
25 g of acrylic acid and
475 g of 2-ethylhexyl acrylate
is added dropwise at 80° C. during 4 hours. Stirring is continued for another 4 hours at 80° C. One obtains a solution containing ca. 50% by weight of the polymer. $\eta_{spec}/C = 18$ ml/g.

EXAMPLE 12

Preparation of a Polymer Blend P with LCST by Mixing Polymers $P_1$-XI With $P_2$-XI A toluene solution of about 20% by weight in polymer is produced mixing the 50% polymer solution of $P_1$-XI in toluene with the appropriate amount of $P_2$-XI. This polymer solution is spread out on a glass plate of (0.2 mm thick) and is dried subsequently. One obtains a clear polymerfilm, which suddenly becomes opaque when heated above LCST. The position of the LCST will depend on the ratio of polymer $P_1$-XI to $P_2$-XI. On cooling below LCST the polymer blend within becomes clear again showing that the phase separation is in fact reversible.

Position various LCST's as a function of the ratio of polymer $P_1$-XI to polymer $P_2$-XI present in the blend are given in TABLE 1.

TABLE 1

| Proportion of polymer components polymer blend P | | LCST |
| --- | --- | --- |
| $P_1$-XI | $P_2$-XI | [°C.] |
| 10 | 90 | 170 |
| 30 | 70 | 130 |
| 50 | 50 | 120 |
| 70 | 30 | 110 |
| 90 | 10 | 120 |

EXAMPLE 13

In an analogous manner as described for $P_1$-XI/$P_2$-XI polymer blends additional polymer blends based on polymers $P_1$-XI/$P_2$-XII or $P_2$-XIII are produced by mixing 50% by weight of $P_1$-XI with 50% by weight of $P_2$-XII or 50% by weight of $P_2$-XIII:

13.1 polymer blend $P_1$-XI/$P_2$-XII LCST: 75° C.
13.2 polymer blend $P_1$-XI/$P_2$-XIII LCST: 54° C.

EXAMPLE 14

Production of an Indicator Panel

A polymer blend P consisting of 50% by weight of polymer $P_1$-XI and 50% by weight of polymer $P_2$-XII is inbedded in a matrix of polymethylmethacrylat (PMMA).
Basic support: PMMA plate, 3 mm thick
Intermediate layer: Punctured layer of PMMA, 0,8 mm thick (lattice sheet with a web distance of 4 mm, web height: 1 mm.
Covering layer: PMMA, 1 mm thick.

Each lattice unit formed by the webs (having 3 mm × 3 mm × 0.8 mm) is filled with the polymer blend P consisting of 50% by weight of polymer $P_1$-XI and 50% by weight of polymer $P_2$-XII. By warming the individual plate segments to 95° C. e.g. by infrared radiation) a topical cloudiness can be produced discernible with the naked eye. After the supply of thermal energy had been discontinued the cloudiness disappeared within approx. 1 minute.

EXAMPLE 15

The same method for imbedding the polymer blend is used as in example 14, except that a different polymer composition is chosen (the difference in refractive indices of $P_1$ and $P_2$ being greater). They are produced as an organic dispersion. Polymer $P_1$-XII has a refractive index $n_D^{20}=1.47$; polymer $P_2$-XIV has a refractive index $n_D^{20}=1.56$.

Preparation of Polymer Blends $P_1$-XII/$P_2$-XIV

In a polymerization vessel a mixture of
60 g of 1-propanol
1.8 g of acrylic acid
0.03 g of dodecylmercaptane
58.2 g of n-butylacrylate
0.12 g of tert.-butylperoxyneodecanoate
is polymerized during 3 hours (bath temperature: 50° C.) One obtains a clear polymer solution $P_1$-XII ($\eta_{spec}/C=53$ ml/g). Subsequently the following components are added:

60 g of 1-propanol
1.3 g of 3-dimethylamino-2,2-dimethyl-propyl-1-methacrylate
31.2 g of 3-phenyl propyl-1-acrylate and
0.03 g of tert.-butylperoxy neodecanoate (=$P_2$-XIV)
Polymerization is carried out for 3 hours at 50° C. with argon as a protective gas. One obtains a viscous, white polymer dispersion, which after drying at room temperature yields a clear film. A film applied to a glass plate, which is perfectly clear up to ca. 65° C. will become cloudy on warming above LCST (80° C.).

The invention now being fully described, it will be apparent to one ordinary skill in the art that many changes and modifications can be made thereto without departing from the spirit or scope of the invention as set forth herein.

Each and every publication, patent or otherwise, specifically identified in this specification represents a teaching of the understanding of those skilled in the art at the time this invention was made and is herein individually incorporated by reference to the same extent as if it had been physically reproduced in the location and for the purpose as identified by the context in which it is found.

What is claimed as new and desired to be secured by Letters Patent of the United States is:

1. A process for recording, storing and displaying optically readable information on a carrier comprising effecting a thermal energy change on a polymer mixture P as the information carrier and said change on the polymer mixture P, said polymer mixture P comprising at least two different, mutually compatible polymers $P_1$ and $P_2$, which differ in their refractive indexes by at least 0.01, and having a lower critical solution temperature (LCST), the optically differentiable modification of the information carrier being brought about by phase transition from a compatible polymer mixture below the LCST to demixed polymers $P_1$ and $P_2$ above the LCST or the reverse of this transition, wherein, in the demixed state above the LCST, the two polymer phases are present side-by-side, at least one polymer phase of which has a domain size in the range of 10 nm$^2$ to $10^8$ nm$^2$.

2. The process of claim 1, wherein the transition from a one-phase region, characterized by polymer compatibility, to a two-phase region, characterized by demixing, is brought about by an increase in temperature and the transition in the reverse direction is brought about by a decrease in temperature.

3. The process of claim 1, wherein the polymers differ in their refractive index by at least 0.03.

4. The process of claim 1, wherein the polymer mixture P has an LCST below 250° C.

5. The process of claim 1, wherein the polymer mixture P has an LCST below 140° C.

6. The process of claim 1, wherein the polymer mixture P has an LCST below 100° C.

7. The process of claim 1, wherein, on increasing the temperature from 10° C. below the LCST to 10° C. above the LCST, light transmission is reduced by at least 20%, the determination being carried out on a 0.1 mm thick, unpigmented sample.

8. The process of claim 7, wherein the transmission of the sample is more than 80% in the temperature range from 10° C. below the LCST to at least 50° C. below the LCST.

9. The process of claim 1, wherein the transmission is reduced by at least 20% in a temperature interval of less than 10° C.

10. The process of claim 1, wherein input of information by application of energy is accomplished by means of a temperature change at a rate of more than 1° C./sec.

11. The process of claim 10, wherein the input of information is accomplished by means of a temperature change at a rate of more than 10° C./1 sec.

12. The process of claim 10, wherein the input of information is accomplished by means of a temperature change at a rate of more than 10° C./0.1 sec.

13. The process of claim 1, wherein at least one polymer phase has a domain size in the range of $10^2$ nm$^2$ to $10^6$ nm$^2$.

14. The process of claim 1, wherein the glass transition temperature $T_g$ of the compatible polymer mixture P is below 150° C.

15. The process of claim 14, wherein the glass transition temperature $T_g$ of the compatible polymer mixture P is below 100° C.

16. The process of claim 14, wherein the glass transition temperature $T_g$ of the compatible polymer mixture P is below 50° C.

17. The process of claim 14, wherein the glass transition temperature $T_g$ of the compatible polymer mixture P is below 0° C.

18. The process of claim 14, wherein the glass transition temperature $T_g$ of the compatible polymer mixture P is below −50° C.

19. The process of claim 1, wherein one or more low molecular weight substances W are further added to the polymer mixture P.

20. The process of claim 19, wherein 0.1–1,000 weight percent, based on the polymers $P_1$ and $P_2$, of low molecular weight substance is added to the polymer mixture P.

21. The process of claim 20, wherein 5–300 weight percent of a low molecular weight substance W is added to the polymer mixture P.

22. The process of claim 19, wherein the low molecular weight substance W has a solid point of less than 10° C.

23. The process of claim 1, wherein the temperature difference between the LCST and the glass transition temperature $T_g$ of the polymer mixture P is at least 20° C.

24. The process of claim 1, wherein the glass transition temperature $T_g$ of the polymer mixture P is at least 50° C. below the LCST.

25. The process of claim 24, wherein the glass transition temperature $T_g$ of the polymer mixture P is at least 100° C. below the LCST.

26. The process of claim 19, wherein the low molecular weight substance W is a solvent for at least one of the polymers $P_1$ or $P_2$.

27. The process of claim 19, wherein the low molecular weight substance W does not have the same refractive index as the polymers $P_1$ and $P_2$.

28. The process of claim 19, wherein at least one of the two polymers $P_1$ and $P_2$ is insoluble in water at temperatures ranging from 0° to 100° C.

29. The process of claim 19, wherein the polymers, which form polymer mixture P, are not soluble in water.

30. The process of claim 1, wherein at least one of the polymers $P_1$ and $P_2$ has a carbon content greater than 80%.

31. The process of claim 1, wherein at least one of the polymers forming the polymer mixture P contains at least 5 weight percent of one or more groups with a double bond or a triple bond on a carbon atom.

32. The process of claim 1, wherein at least one of the polymers forming the polymer mixture P contains more than 10 weight percent of covalently bonded halogen from the group of fluorine, chlorine or bromine.

33. The process of claim 1, wherein at least one of the polymers forming the polymer mixture P contains more than 10 weight percent of covalently bonded chalcogen from the group of oxygen or sulfur.

34. The process of claim 1, wherein the ratio of the halogen content in weight percent in polymer $P_1$ to that in polymer $P_2$ is greater than 1.5:1.

35. The process of claim 31, wherein the ratio of the oxygen content in weight percent in polymer $P_1$ to that in polymer $P_2$ is greater than 1.2:1.

36. The process of claim 1, wherein at least one of the polymers forming the polymer mixture P represents a copolymer, in which the monomer present as the main component constitutes no more than 95 weight percent.

37. The process of claim 1, wherein the polymer mixture P has a single glass transition temperature $T_g$ and no crystalline regions at temperatures ranging from room temperature to the LCST.

38. The process of claim 1, wherein the polymer mixture P contains means of protection against aging or UV in amounts of 0.01 to 10 weight percent.

39. The process of claim 1, wherein at least one of the two polymers $P_1$ or $P_2$ has an average molecular weight of at least 2,000.

40. The process of claim 39, wherein both polymers $P_1$ or $P_2$ have an average molecular weight of at least 10,000.

41. The process of claim 39, wherein at least one of the two polymers $P_1$ and $P_2$ has an average molecular weight in the range of 2,000 to 500,000.

42. The process of claim 39, wherein at least one of the two polymers $P_1$ and $P_2$ has an average molecular weight in the range of 10,000 to 500,000.

43. The process of claim 1, wherein at least 0.1 weight % of polymer $P_1$ is covalently bonded to the polymer $P_2$.

44. The process of claim 43, wherein polymer $P_1$ is covalently linked with polymer $P_2$ through block polymerization or graft polymerization.

45. The process of claim 1, wherein the mixing ratio of polymer $P_1$ to polymer $P_2$ in the polymer mixture P lies in the range of 98:2 parts by weight to 2:98 parts by weight.

46. The process of claim 45, wherein the mixing ratio of polymer $P_1$ to polymer $P_2$ lies in the range of 90:10 parts by weight to 10:90 parts by weight.

47. The process of claim 45, wherein the mixing ratio of polymer $P_1$ to $P_2$ lies in the range of 80:20 parts by weight to 20:80 parts by weight.

48. The process of claim 1, wherein the polymer mixture is dyed.

49. The process of claim 48, wherein a soluble dye is used for the dyeing.

50. The process of claim 48, wherein a coloring matter with pigment particles is used, the diameter of which does not exceed 50% of the average diameter observed in the polymer phase domains, which are formed by demixing.

51. The process of claim 1, wherein the polymer mixture P is used directly without a supporting base.

52. The process of claim 1, wherein the polymer mixture P is on a supporting base.

53. The process of claim 52, wherein the polymer mixture P adheres to a supporting base.

54. The process of claim 52, wherein the polymer mixture P is embedded, using a supporting base and a covering.

55. The process of claim 52, wherein the supporting base consists of a transparent, inorganic material, selected from the group of silicate glass or chalcogenide glass.

56. The process of claim 52, wherein the supporting base comprises a transparent plastic.

57. The process of claim 56, wherein the transparent plastic is a polymer selected from the group consisting of acrylic resins, cellulose hydrate, regenerated cellulose, polyamide, polyester, polyvinylchloride, polyolefin, polyglycol, polyacetal, polysulfone, polysulfide, polymethane, polyether, polycarbonate and 4-methyl-1-pentene.

58. Process as defined in claim 52, wherein the supporting base is dyed.

59. The process of claim 1, wherein the polymer mixture P is applied to or embedded in a supporting base and has the geometric form of a plate, disk, or tape.

60. The process of claim 1, wherein the polymer mixture P is used in a thickness of less than 1 mm.

61. The process of claim 60, wherein the polymer mixture P is used in a thickness of less than 0.1 mm.

62. The process of claim 60, wherein the polymer mixture P is used in a thickness of less than 0.01 mm.

63. The process of claim 1, wherein the polymer mixture P is incorporated in a material functioning as a matrix M.

64. The process of claim 63, wherein the refractive index of the material forming the matrix M is identical with the refractive index of the polymer mixture P below the LCST.

65. The process of claim 52, wherein when layers that do not consist of polymer mixture P are used for embedding in the form of a matrix or as a supporting base or as a covering layer, the thickness of at least one of these layers does not exceed 0.5 mm.

66. The process of claim 1, wherein the polymer mixture P is used as a fiber.

67. The process of claim 63, wherein the polymer mixture P is incorporated in the form of discrete particles with a diameter in the range of 20 nm to 200 $\mu$m in a material functioning as a matrix.

68. The process of claim 67, wherein said polymer mixture P is incorporated in the form of discrete particles with a diameter of 50 nm to 50 $\mu$m in a matrix M functioning as a matrix.

69. The process of claim 1, wherein at least one polymer component of the polymer mixture P is produced by emulsion polymerization.

70. The process of claim 1, wherein both polymer components $P_1$ and $P_2$ of the polymer mixture P are produced by emulsion polymerization.

71. The process of claim 70, wherein the emulsion polymerization is carried out according to the core-shell principle, with a latex, built up largely from polymer component $P_1$, functioning as a seed latex for the emulsion polymerization of polymer component $P_2$.

72. The process of claim 71, wherein the emulsion polymerization is carried out in a process, which comprises three consecutive steps, the polymerization to polymer component $P_1$, to polymer component $P_2$ and to polymer component PM, PM being a polymeric material which is compatible with the matrix M.

73. The process of claim 1, wherein the following condition is fulfilled:

$\eta_D$ matrix $> \eta_D$ polymer $P_1$ ($\Delta\eta > 0.01$)

$\eta_D$ matrix $< \eta_D$ polymer $P_2$ ($\Delta\eta > 0.01$)

$\eta_D$ matrix $\simeq \eta_D$ polymer mixture P ($\Delta\eta < 0.01$)

74. The process of claim 1, wherein the polymer mixture P, or the whole of the system containing the polymer mixture P, is maintained at a working temperature no more than 20° C. below the LCST, before the information is introduced.

75. The process of claim 1, wherein the cloudiness of polymer mixture P, produced by exceeding the LCST, is frozen-in by cooling at a rate of at least $-10°$ C./sec.

76. The process of claim 1, wherein the cloudiness, produced by exceeding the LCST, is deleted once again by heating at a temperature, 20° C. to 1° C. below the LCST for a period of less than 1 hour.

77. The process of claim 1, wherein the information, perceived as cloudiness of polymer mixture P, is entered digitally.

78. The process of claim 1, wherein the information is read with an optical device.

79. The process of claim 1, wherein the information is read with a photocell.

80. A process for recording, storing and displaying optically readable information on a carrier, comprising effecting a thermal energy change on a polymer mixture P as the information carrier and optically reading the effects of said change on the polymer mixture P, said polymer mixture P comprising a carbonyl group-containing polymer $P_1$ and a halogen-containing polymer $P_2$, which differ in their refractive indexes by at least 0.01, and having a lower critical solution temperature (LCST), the optically differentiable modification of the information carrier being brought about by phase transition from a compatible polymer mixture below the LCST to demixed polymers $P_1$ and $P_2$ above the LCST or the reverse of this transition.

* * * * *